… … …

United States Patent [19]

Müller et al.

[11] Patent Number: 5,269,582

[45] Date of Patent: Dec. 14, 1993

[54] CONVERTIBLE TOP

[75] Inventors: Hubert Müller; Manfred Kasparak, both of Neureichenau, Fed. Rep. of Germany

[73] Assignee: Firma Parat-Werk Schonenbach GmbH & Co. KG, Remscheid, Fed. Rep. of Germany

[21] Appl. No.: 868,367

[22] Filed: Apr. 14, 1992

[30] Foreign Application Priority Data

Apr. 15, 1991 [DE] Fed. Rep. of Germany ....... 4112256

[51] Int. Cl.$^5$ .................................................. B60J 7/12
[52] U.S. Cl. .................................... 296/135; 296/116; 296/118
[58] Field of Search ............... 296/135, 107, 116, 118, 296/219

[56] References Cited

U.S. PATENT DOCUMENTS

| 1,778,356 | 10/1930 | Coppock . | |
| 2,544,580 | 3/1951 | Blanchet | 296/135 |
| 2,714,525 | 8/1955 | Kessler | 296/135 X |
| 2,785,003 | 3/1952 | Zaravsey . | |
| 3,486,788 | 12/1969 | Benton . | |
| 4,626,021 | 12/1986 | Muscat . | |
| 5,040,844 | 8/1991 | Stolz et al. | 296/107 |

FOREIGN PATENT DOCUMENTS

| 519499 | 2/1931 | Fed. Rep. of Germany . |
| 599270 | 6/1934 | Fed. Rep. of Germany . |
| 674015 | 1/1930 | France . |
| 870098 | 3/1942 | France . |

Primary Examiner—Joseph D. Pape
Attorney, Agent, or Firm—Herbert Dubno; Yuri Kateshov

[57] ABSTRACT

A convertible top has the edges of its cover stitched to polyethylene-shaped strips which conform to the undersides of the frame members around the front, rear and sides of the convertible top. The strips are held against the undersides of the frame members complementarily by holding rails and screws, and sealing strips are fitted onto the holding rails.

11 Claims, 4 Drawing Sheets

CONVERTIBLE TOP

FIELD OF THE INVENTION

Our present invention relates to a convertible top, and, more particularly, to a flap-type, folding or other convertible top for an automotive vehicle such as a coupe, cabriolet or the like.

Specifically the invention relates to a convertible top of the type in which a flexible cover is applied to a frame which can have relatively movable frame parts, including bows, stirrups and ribs, to which the cover is attached, and which can swing into and out of or be folded or unfolded with respect to the body of the vehicle provided with the convertible top.

BACKGROUND OF THE INVENTION

It has been customary in the past to attach a cover to the frame members of the support frame of the convertible top by adhesive bonding. The frame members are profiles or structural shapes having surfaces around which the flexible cover is stretched and to which the flexible cover is connected by an adhesive.

Since the adhesives used are frequently solvent-based adhesives, the use of the adhesive can create environmental problems and problems with respect to the health of the manufacturing personnel. Furthermore, the mounting costs, assembly cost and, in general, the fabrication costs are considerable since the adhesive requires special handling during the hardening phase and requires a certain time for the setting or hardening.

Furthermore, when it is necessary to replace the cover or to repair it and to remove, therefore, the old cover, all traces of the old adhesive must be removed. This is a time-consuming and difficult operation but must be completed before the new cover is applied.

Mention may also be made of techniques whereby the cover for a vehicle is applied with bows or the like utilizing a clamping operation. For example, the cover can be provided with a bead as described in the German patent 519,499, and clamped between two clamping surfaces along the beaded edge. In this case, the clamp can use a screw arrangement pressing the two surfaces against the bead.

A less complex arrangement which also uses a bead attached by stitching to the cover is found in German patent 599 270, in which the member to which the cover is to be anchored is formed with a groove complementary to the bead and into which the bead is forced.

While both of these latter systems use mechanical connection of the edge of the cover to the frame member, so that they do not manifest the drawbacks of an adhesive bonded system, the former requires a complex construction which is not esthetic while the latter depends upon a frictional trapping of the bead to hold the cover in place. This may be insufficient.

OBJECTS OF THE INVENTION

It is, therefore, the principal object of the present invention to provide a convertible top which is free from the drawbacks outlined above and which nevertheless provides a reliable connection of the cover to the frame.

Another object of the invention is to provide a fold or flap-type convertible top for a cabriolet or the like which facilitates replacement of the cover while nevertheless ensuring firm attachment of the cover to the frame.

A more specific object of the invention is to provide a convertible top which can be manufactured without the drawbacks associated with the use of adhesives and can enable replacement of the cover in an economical and convenient manner.

It is also an object of the invention to provide a convertible top which is improved over the mechanical-connection tops described in that it provides reliable attachment of the cover to the frame without inordinate complexity and visual detriment to the convertible top.

SUMMARY OF THE INVENTION

These objects and others which will become apparent hereinafter are attained, in accordance with the invention, by directly securing to the edges of the cover, shaped strips which are complementary to the profile or cross sectional shape of the underside of the frame member to which the cover is to be connected. These strips lie exclusively along the underside of the profile, are complementary and thus formfitting therewith, extend longitudinally therealong and are connected with the frame member by means of a fastening profile and screws.

More particularly, a convertible top according to the invention of the foldable or flap type and for a cabriolet or the like can comprise:

a support frame formed with a plurality of relatively displaceable frame members along a perimeter of the top and support bows spanning the top;

a flexible cover extending over the frame and the bows and spanned between the frame members, the frame members having undersides of predetermined cross-sectional shapes;

a respective edge strip having a configuration complementary to the cross-sectional shape of the underside of a respective frame member, extending substantially exclusively along the respective underside, complementarily fitted to the respective underside, and stitched directly to an edge of the cover; and means including a fastening profile extending along an exterior surface of each the strip and screws spaced along the fastening profile and transfixing the strip to the respective frame member.

In the formation of the convertible top according to the invention, the shaped strip is stretched to the edge of the cover and the strip itself can be connected to the frame member so that only a few screws are required. Difficulties hitherto encountered in replacement of a cover can be completely eliminated since it is merely necessary to withdraw the screws form the frame to enable a new cover to be applied.

By providing the strip according to the invention, we are able to ensure that no substantial part of the cover need underlie the profile member of the frame. This has been found to be important since the wind action against the frame edges in the past has caused substantial deterioration of the cover when a significant part of the cover had to be bent under the frame and secured directly on the underside thereof. There is also little tendency for exposed edges of the cove to be engaged by the wind and to flutter in the wind.

According to a feature of the invention, the edge of the cover is extended around the edge of the profile or frame member by approximately the width of the stitch seam and under the profile or frame member is formed with an overlapping stitch seam connecting it with the strip. This construction has been found to be highly advantageous in protecting the cover from attack by the wind as the vehicle travels even at high speeds and especially for the front bow of the frame, i.e. the leading edge of the convertible top lying above the windshield.

Alternatively, the edge of the cover can project beyond the profile or frame member by a distance equal approximately to the width of the stitch seam and is there stitched to the strip, the stitch seam being covered by a binder strip which can be sewn in place. This configuration can be used especially for the rear of the convertible top as well as for the sides at which the binder strip can also form a rain-conducting trough.

The strip can be a bendable synthetic resin, for example polyethylene, and can be shaped to accurately fit against the profile frame member along the underside thereof.

The fastening profile can be formed as a rail which can have the shape of a channel or of a projecting rib and can engage a bar-shaped sealing profile which can have a projection fitting into the channel or a groove fitting over the rib. The sealing profile can, of course, be applied by sliding it along the rail or pressing it onto or into the latter.

BRIEF DESCRIPTION OF THE DRAWING

The above and other objects, features and advantages of the present invention will become more readily apparent from the following description, reference being made to the accompanying drawing in which.

DESCRIPTION

Figure 1:
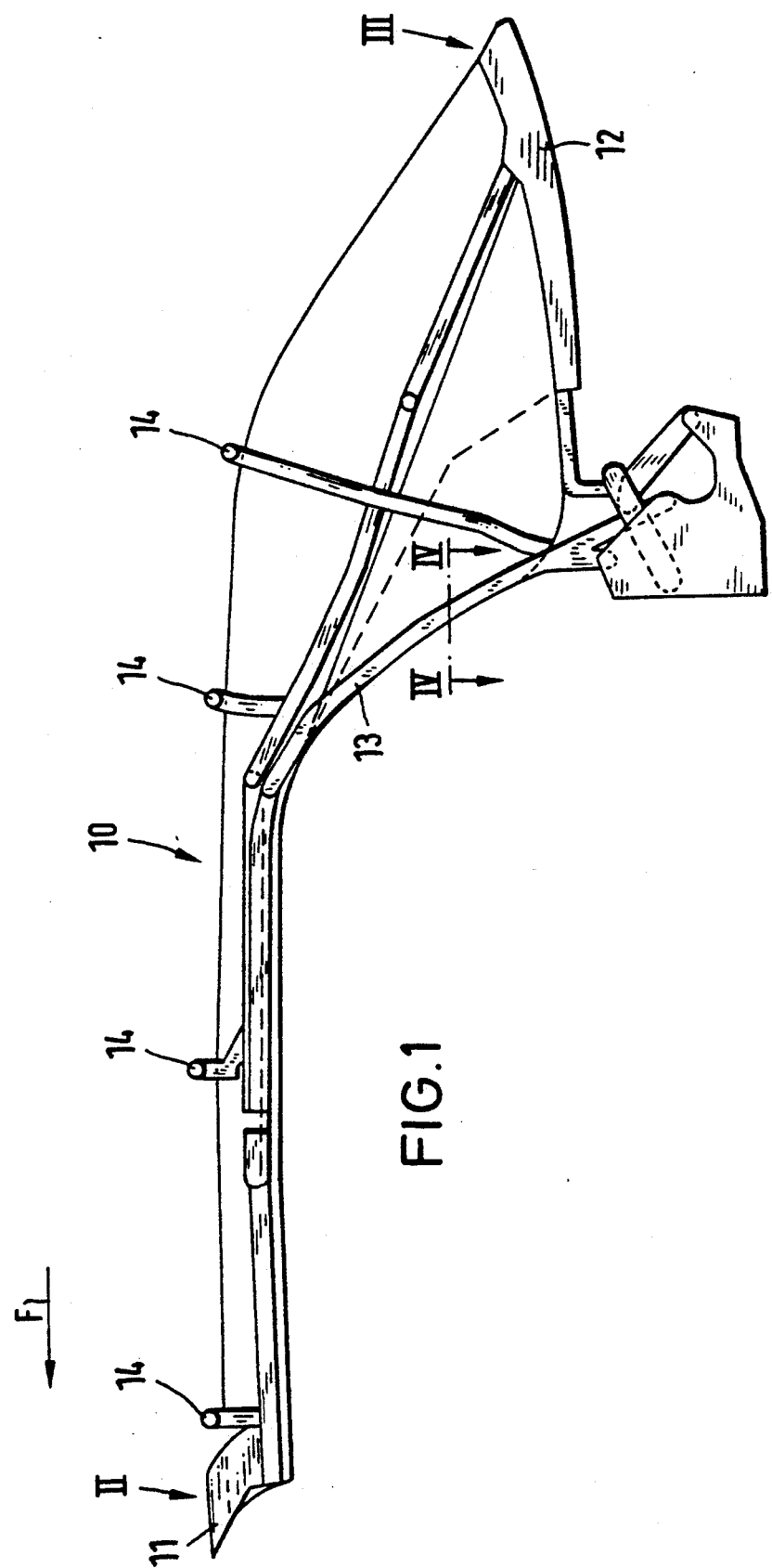
FIG. 1 is a side elevational view schematically illustrating a cabriolet convertible top to which the invention is applicable.

FIG. 1 shows a frame 10 for a flap-type or folding convertible top for a cabriolet or like automotive vehicle. The direction of travel of the vehicle is represented at F and the frame can have a front bow 11 which is intended to overlie the windshield and extends transversely to the direction of travel. Specifically, the front bow 11 lies above the upper beam of the windshield frame. At the rear, the frame 10 comprises a U-shaped profile or so-called stirrup 12 and along the longitudinal edges of the vehicle and along the edges of the side windows thereof, so-called support angles 13. The members 11, 12 and 13 are thus frame members or profiles over and around which the cover is stitched.

The cover is not shown in FIG. 1 but is represented at 15 in the other Figures and is supported between the edge members of the frame by additional bows 14. The frame members and bows are connected together by articulations, links or the like to enable the convertible top to extend and cover the passenger compartment of the vehicle.

Figure 2:
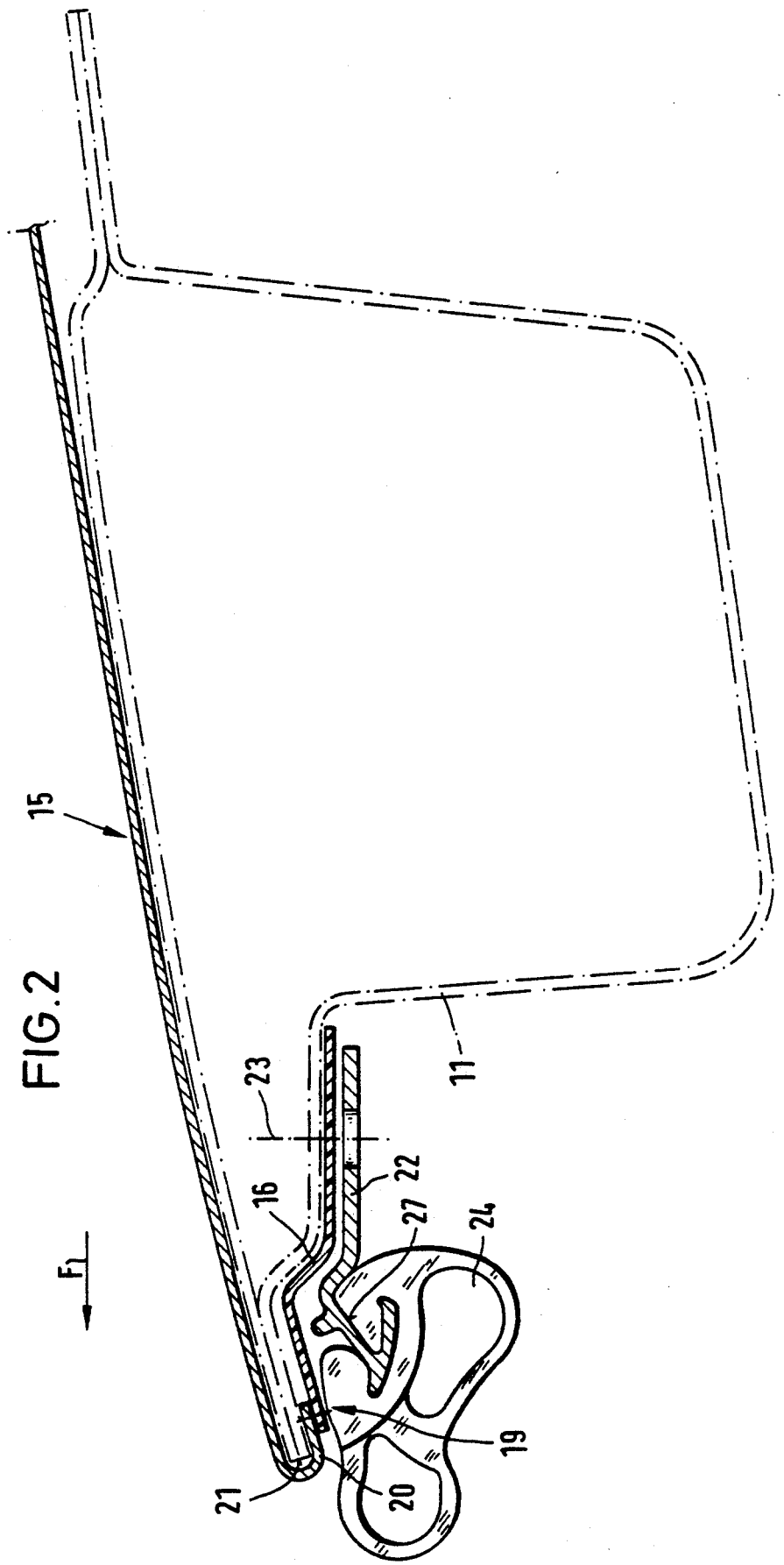
FIG. 2 is a schematic cross sectional view drawn to a larger scale than FIG. 1 and showing the attachment of the cover to the frame member at the front end of the frame, i.e. the region II in FIG. 1.
Figure 3:
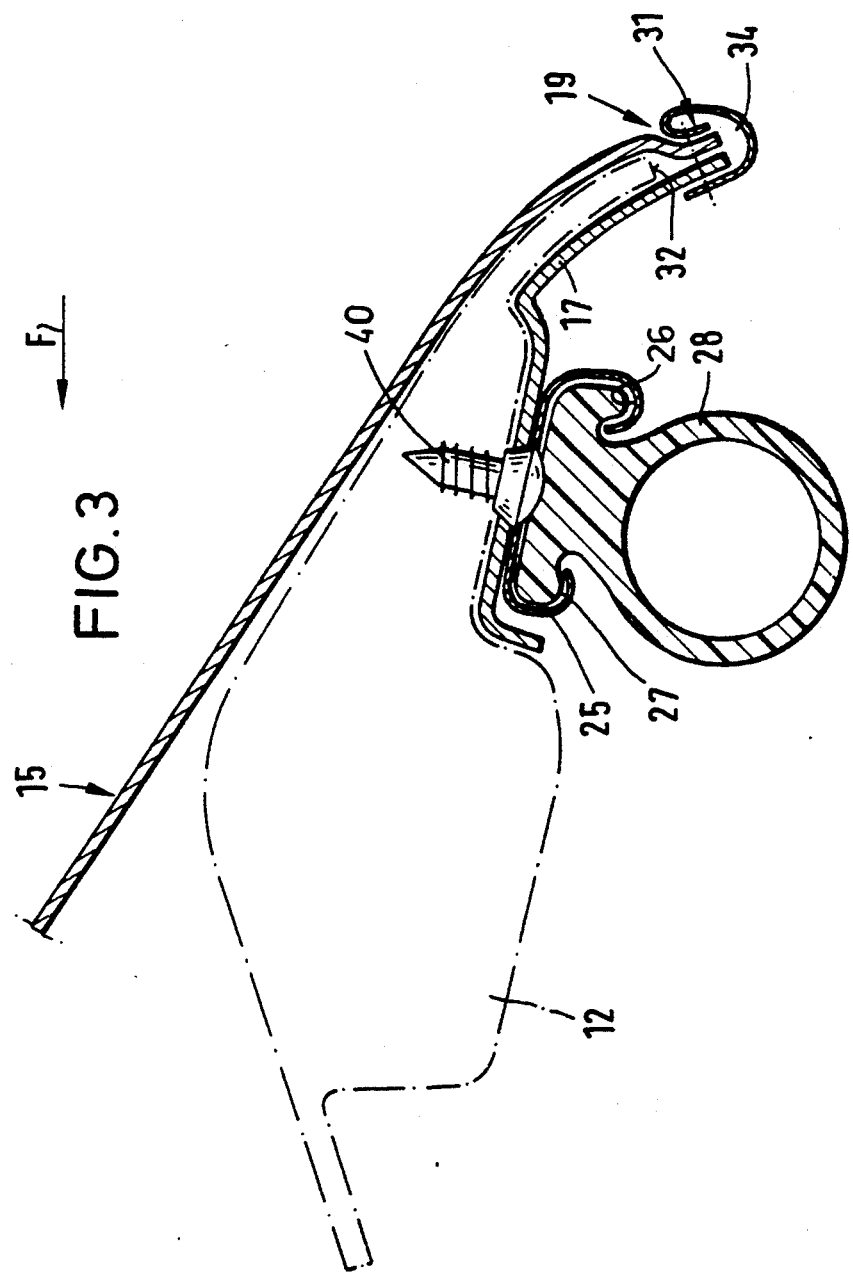
FIG. 3 is a view similar to FIG. 2 but showing the connection at the rear of the frame in the region III of FIG. 1.
Figure 4:
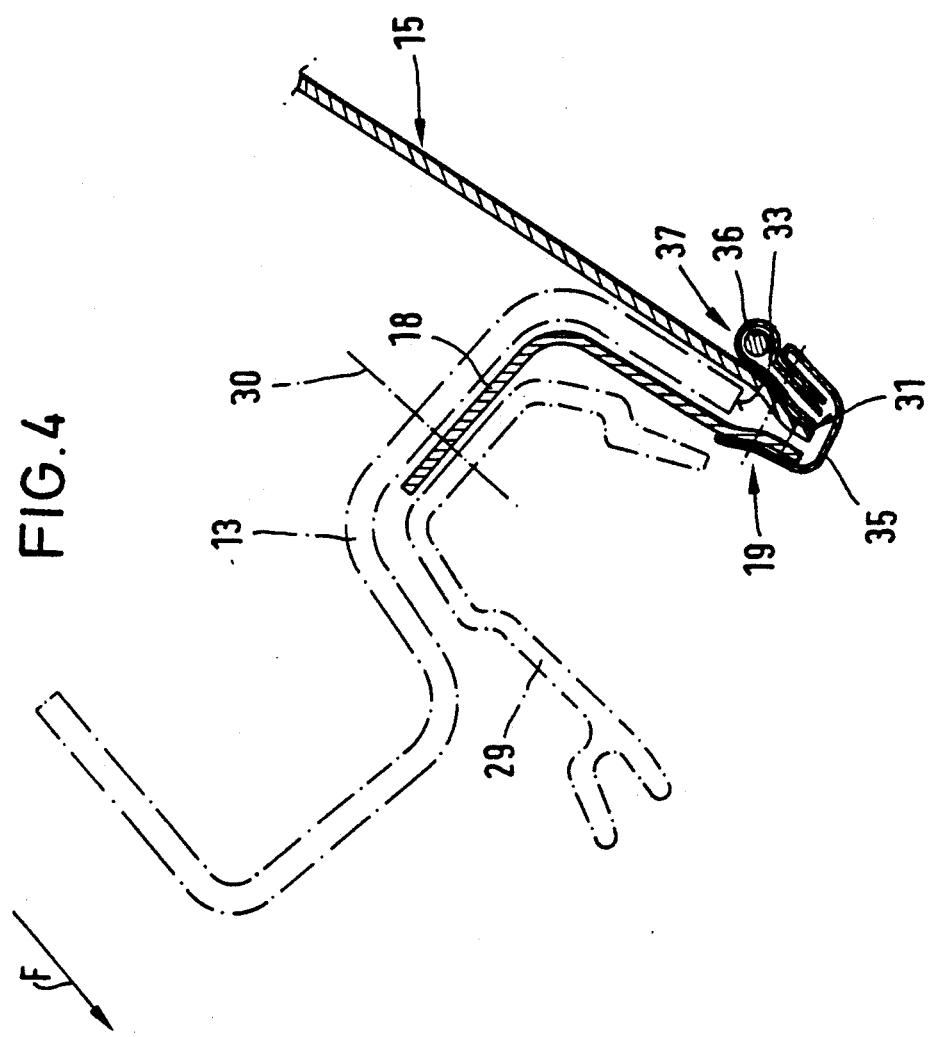
FIG. 4 is a view similar to FIGS. 2 and 3 but showing the connection of the cover to a side member or angle of the frame corresponding, say, to a section IV of FIG. 1.

As will be apparent from FIGS. 2-4, the cover 15, which can be flexible and can be a fabric, is provided with strips 16, 17 and 18 along its edges. These strips are molded strips of a plastic, e.g. polyethylene and each strip 16, 17, 18 is connected by a strip seam 19 of the cover 15.

For the fastening of the cover 15 at the front bow 11, the edge of the convertible top initially encountering the wind resistance, the front edge 20 of the cover 15 is drawn around the front edge 21 of the front bow 11 and overlappingly to the front edge of the shaped strip 16 which is made out of bendable plastic. The molded strip 16 is shaped in both its longitudinal direction and its transverse cross section as shown in FIG. 2 to correspond to the shape of the underside of the front bow 11.

The strip 16 is held in place by a fastening rail 22 and spaced apart screws which extend along screw axes represented at 23. The type of screw used, of course, can correspond to that shown at 40 in FIG. 3.

The strip 16 is thus held in place between the fastening rail 24 and the front bow 11. The rail 22 has a rib 27 at its forward side over which a sealing strip 22 can be forced so that the rib 27 engages in a groove of the sealing strip 24 which rests sealingly against the upper rim of the windshield frame (not shown) when the convertible top is extended.

As can be seen from FIG. 3, the strip 17 at the rear stirrup 12 is also connected to the latter by a fastening rail 25 and the screws 40. The fastening rail 25 is undercut at 26 to receive the T-shaped projection 27 of a sealing strip 28. This sealing strip lies along the rear shelf of the passenger compartment when the convertible top is in place to cover the passenger compartment. The rail 25, like the strip 28 and the strip 17, can be an extruded member.

Along both of the sides of the vehicle, strips 18 are connected to the respective angles 13 by fastening rails 29 (FIG. 4) and screws represented by the axis 30.

In this region and in the region at the rear of the cover (FIG. 3), edge portions 31 of the cover 15 equal in width to that of the stitch seam, project beyond the edges 32 or 33 of the stirrup 12 or the support angle 13 and are there stitched edge-to-edge with the respective strip 17 or 18.

A binder strip 34 (FIG. 3) or 35 (FIG. 4) engages around the stitched region. The binder strips of the lateral fastening arrangements as well as at the rear of the convertible top can form rain channels. For this purpose an additional strip with a bead 36 can be stitched into the binder (FIG. 4). The rain channel is shown at 37 in FIG. 4.

We claim:
1. A convertible top for an automobile, comprising:
   a support frame formed with a plurality of relatively displaceable frame members along a perimeter of said top and support bows spanning said top;
   a flexible cover extending over said frame and said bows and spanned between said frame members, said frame members having undersides formed with respective cross-sectional shapes;
   a plurality of edge strips, each of said strips having a configuration complementary to the cross-sectional shape of the underside of a respective frame member, extending substantially exclusively along the respective underside, complementarily fitted to the respective underside, and stitched directly to an edge of the cover; and
   means including a fastening profile extending along an exterior surface of each said strip and screws spaced along said fastening profile and transfixing said strip to the respective frame member.

2. The convertible top defined in claim 1 wherein at said edge of said cover, said cover is turned under a respective one of said frame member juxtaposed with said edge and forms an overlapping stitched seam with the respective strip.

3. The convertible top defined in claim 1 wherein said edge of said cover extends beyond the respective frame member by a distance equal substantially to a width of a stitch seam and is stitched to a corresponding width of the respective strip, a binder strip extending around said stitch seam and being stitched into said seam.

4. The convertible top defined in claim 1 wherein said strip is composed of a bendable plastic.

5. The convertible top defined in claim 4 wherein said bendable plastic is polyethylene.

6. The convertible top defined in claim 1 wherein said fastening profile includes a rail and a sealing strip form-fittingly engaged with said rail.

7. The convertible top defined in claim 6 wherein said rail is a channel and said sealing strip has a projection anchored in said channel.

8. The convertible top defined in claim 6 wherein said rail has a rib and said sealing strip has a groove receiving said rib.

9. The convertible top defined in claim 6 wherein said rail and said sealing strip are so constructed and arranged that said sealing strip is connected to said rail by sliding said sealing strip along said rail.

10. The convertible top defined in claim 6 wherein said rail and said sealing strip are so constructed and arranged that said sealing strip is connected to said rail by forcing said sealing strip into said rail.

11. The convertible top defined in claim 6 wherein said rail and said sealing strip are so constructed and arranged that said sealing strip is connected to said rail by forcing said sealing strip over said rail.

* * * * *